(12) United States Patent
Muff (10) Patent No.: US 12,174,981 B2
(45) Date of Patent: Dec. 24, 2024

(54) COHERENT IMAGE ENCRYPTION (71) Applicant: ICEYE OY, Espoo (FI)

(72) Inventor: Darren Muff, Espoo (FI)

(73) Assignee: ICEYE OY, Espoo (FI)

( * ) Notice: Subject to any disclaimer, the term of this patent is extended or adjusted under 35 U.S.C. 154(b) by 0 days.

(21) Appl. No.: 18/698,636

(22) PCT Filed: Oct. 10, 2022

(86) PCT No.: PCT/EP2022/078054
§ 371 (c)(1),
(2) Date: Apr. 4, 2024

(87) PCT Pub. No.: WO2023/066698
PCT Pub. Date: Apr. 27, 2023

(65) Prior Publication Data
US 2024/0338470 A1  Oct. 10, 2024

(30) Foreign Application Priority Data
Oct. 19, 2021 (GB) ..................................... 2114920

(51) Int. Cl.
*H04L 29/06* (2006.01)
*G01S 13/90* (2006.01)
(Continued)

(52) U.S. Cl.
CPC ...... *G06F 21/6209* (2013.01); *G01S 13/9021* (2019.05); *G06F 21/602* (2013.01); *G06F 21/6245* (2013.01)

(58) Field of Classification Search
CPC .... G06F 21/6209; G06F 21/602; G06F 21/71; G06F 21/6245; H04L 9/28; H04L 9/005
(Continued)

(56) References Cited

U.S. PATENT DOCUMENTS 6,519,340 B1 * 2/2003 Javidi .................. H04N 7/1675
380/219
9,798,290 B2 * 10/2017 Tsang ................... G03H 1/2286
(Continued)

FOREIGN PATENT DOCUMENTS

| CN | 112698328 A | 4/2021 |
|---|---|---|
| CN | 1112711766 A | 4/2021 |
| KR | 2019 0139483 A | 12/2019 |

OTHER PUBLICATIONS

Selimovic, Faruk, et al., "Authentication Based on the Image Encryption using Delaunay Trangulation and Catalan Objects," Acta Polotechnica Hungarica, Jan. 2020, 19 pages.
(Continued)

*Primary Examiner* — Longbit Chai
(74) *Attorney, Agent, or Firm* — DENTONS US LLP (57) ABSTRACT

A computer-implemented method for encrypting image, wherein the image data is generated by collection of a signal, the signal having a bandwidth, and the image data comprises data corresponding to a plurality of pixels of an image, wherein each pixel has an associated phase value; and the method comprises the step of modifying each of the phase values respectively associated with each of the plurality of pixels based on a first encryption key, wherein a rate of change of phase between adjacent pixels, after the step of modifying each of the phase values, does not exceed the bandwidth.

15 Claims, 8 Drawing Sheets

Not to scale (51) Int. Cl.
*G06F 21/60* (2013.01)
*G06F 21/62* (2013.01)

(58) Field of Classification Search
USPC ......................................................... 713/193
See application file for complete search history.

(56) References Cited

U.S. PATENT DOCUMENTS

2016/0110564 A1    4/2016  Tsang Peter
2019/0356931 A1*  11/2019  Marwood .............. H04N 19/90

OTHER PUBLICATIONS

PCT Written Opinion and International Search Report issued in connection with related PCT/EP2022/078054 dated Jan. 31, 2023.

* cited by examiner

Fig. 1

Not to scale

COHERENT IMAGE ENCRYPTION

RELATED APPLICATION DATA

This application is the National Stage filing under 35 U.S.C. 371 of International Application No. PCT/EP2022/078054 filed on 10 Oct. 2022, which claims priority to GB Application No. 2114920.8 filed on 19 Oct. 2021, the contents of both of which are hereby incorporated by reference herein in their entirety to the extent permitted by law.

FIELD OF THE INVENTION

The present application relates to a method of encrypting coherent image data. In particular, the present invention relates to a method of encrypting image data such that coherence within the image is not lost.

BACKGROUND TO THE INVENTION

Information and data security is becoming an increasingly important and ubiquitous part of modern society. The need to maintain the security of data and information is now of paramount importance. Such data can include personal information, corporate information, or government-owned data, amongst others. One of the methods for ensuring data security is encrypting the data with an encryption key to prevent the data from being accessed, read, and/or edited by an entity that does not have a copy of the encryption key.

Amongst the many forms of data that a data owner may wish to keep secure is image data. Image data can refer to any form of data that is collected by an imaging device and stored in a multi-dimensional array. Commonly, image data is stored in a two-dimensional array, with each element of the array defining the properties of a pixel of an image. Image data can be encrypted by applying an encryption key to each pixel of an image, thereby randomising one or more of the properties of each pixel of the image.

In modern systems, it has been recognised that a set of coherent images includes information beyond that which exists purely within each image of the set in isolation. In other words, in a set of coherent images, the coherence between said images can provide additional information. Commonly, this information is deduced using coherent analysis techniques. A set of coherent images can be obtained by periodically imaging the same target from the same distance and orientation. For example, in satellite-imaging, a satellite can generate a set of coherent images by generating an image of a particular target every time the satellite completes an orbit of the Earth (i.e. if the satellite images the same position on the surface of the Earth each time it passes through the same point above the Earth, then the set of images obtained by the satellite will be coherent with one another).

One such coherent technique is Coherent Change Detection (CCD). CCD detects changes between coherent images that are unlikely to be visible to the human eye. This is because the sensitivity of CCD is a mere fraction of the wavelength of the light used to collect the image. For example, in the context of radar imaging, CCD can resolve changes on the order of centimetres from a satellite-collected image. In the context of synthetic aperture radar (SAR) imaging, CCD provides a user with the ability to see miniscule differences between two SAR images with a resolution that exceeds that of "naked-eye" analysis.

Another coherent technique used in SAR imaging is Digital Elevation Model (DEM) generation. DEM exploits subtle differences in position between two coherent images. The phase information associated with each pixel in each of the coherent images is then compared and variations relative to a reference plane are highlighted. In other words, in SAR imaging, phase information can be used to infer the height of a feature in the image relative to a reference "zero" height. DEM generation allows this height data to be obtained from the phase variation information via phase unwrapping to form a three-dimensional digital elevation model of the area.

A third coherent technique used in SAR imaging is differential Interferometric Synthetic Aperture Radar imaging (InSAR). InSAR can be thought of as a combination of the CCD and DEM techniques discussed above. In particular, InSAR facilitates the detection of very subtle changes in elevation over time. Satellite-generated images can be analysed with InSAR to detect changes on the order of a millimetre over the course of a month in an environment. This can be used to identify a range of dangerous and emerging situations ranging from land slippage to infrastructure collapse, such as the collapse of a dam or bridge.

In light of the increased information that is available from a set of coherent images via coherent analysis techniques such as those discussed above, it is apparent that there is a new form of data that may require encryption to ensure its security. In some scenarios, a data owner may wish to have different levels or forms of security for data relevant for individual image analysis as opposed to data relevant for coherent image analysis. In other words, while a data owner may wish to give a data user access to each of the images within a set of coherent images, they may wish to restrict their access to the information that can be obtained via a coherent analysis technique such as those discussed above.

The inventors have devised the claimed invention in light of the above considerations.

The embodiments described below are not limited to implementations which solve any or all of the disadvantages of the known approaches described above.

SUMMARY OF INVENTION

This Summary is provided to introduce a selection of concepts in a simplified form that are further described below in the Detailed Description. This Summary is not intended to identify key features or essential features of the claimed subject matter; variants and alternative features which facilitate the working of the invention and/or serve to achieve a substantially similar technical effect should be considered as falling into the scope of the invention.

The invention is defined as set out in the appended set of claims.

In a general sense, the present invention provides a method of encrypting image data such that, while the individual image can still be analysed by a data user without needing to decrypt, the image cannot be successfully used for coherent image analysis having regard to other images in the set of images without first decrypting the image data. In other words, the present invention provides a data owner with the flexibility to secure, by encryption, information relevant to coherent image analysis without encrypting information relevant to individual image analysis.

In a first aspect of the present invention there is provided a computer-implemented method for encrypting image data, wherein the image data is generated by collection of a signal, the signal having a bandwidth, and the image data comprises data corresponding to a plurality of pixels of an image, wherein each pixel has an associated phase value; and the method comprises the step of: modifying each of the phase values respectively associated with each of the plurality of pixels based on a first encryption key, wherein a rate of change of phase between adjacent pixels, after the step of modifying each of the phase values, does not exceed the bandwidth.

In some examples, the images may be further encrypted with a 'classical' encryption technique for additional security. The skilled person will understand, based on the disclosure herein, that any such classical encryption must encrypt the phase information within each image in a way that is reversible, i.e. in such a way that when classically encrypted images are decrypted, the phase information can be retrieved. In other words, the coherent encryption methods described herein may be combined with additional classical encryption techniques performed after the coherent encryption methods described herein, provided that said classical encryption techniques do not irretrievably destroy the phase information encoded in each of the images. In another aspect of the present invention, there is provided an apparatus comprising a processor configured to perform any of the methods disclosed herein.

The encrypting of the image data associated with the or each image may include selecting a portion of the or each image to be encrypted; and encrypting said portion by modifying each of the phase values respectively associated with each of the plurality of pixels within the selected portion based on the first encryption key. The selected portion to be encrypted may be a central portion of the or each image.

The method may comprise overlaying a respective mask on the or each image to be encrypted, wherein modifying each of the phase values respectively associated with each of the plurality of pixels of the or each image to be encrypted involves deforming the mask based on the first encryption key, and modifying each of the phase values respectively associated with each of the plurality of pixels of the or each image to be encrypted based on the deformation of the mask. The deforming may be based on a non-linear function. A respective function defining a gradient of the or each deformed mask may be discontinuous.

The or each respective mask may comprise a plurality of nodes, and deforming the mask may involve adjusting the respective heights of each node relative to the respective image based on the first encryption key. The position of each of the plurality of nodes in the respective mask may be determined based on a second encryption key. The first and second encryption keys may be the same or different. Each of the one or more images may be encrypted with respectively different second encryption keys.

The method of encrypting the image data may be reversible.

In another aspect of the present invention, there is provided a computer program product comprising instructions which, when the program is executed by a computer, cause the computer to carry out any of the methods disclosed herein.

In another aspect of the invention, there is provided a computer-readable storage medium comprising instructions which, when executed by a computer, cause the computer to carry out any of the methods disclosed herein.

The methods described herein may be performed by software in machine-readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is issued for designing silicon chips, or for configuring universal programmable chips, to carry out desired functions.

The features and embodiments discussed herein may be combined as appropriate, as would be apparent to a person skilled in the art, and may be combined with any of the aspects of the invention except where it is expressly provided that such a combination is not possible or the person skilled in the art would understand that such a combination is self-evidently not possible.

BRIEF DESCRIPTION OF THE DRAWINGS

Embodiments of the present invention are described below, by way of example, with reference to the following drawings.

Common reference numerals are used throughout the figures to indicate the same or similar features.

DETAILED DESCRIPTION

Embodiments of the present invention are described below by way of example only. These examples represent the best mode of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Figure 1:
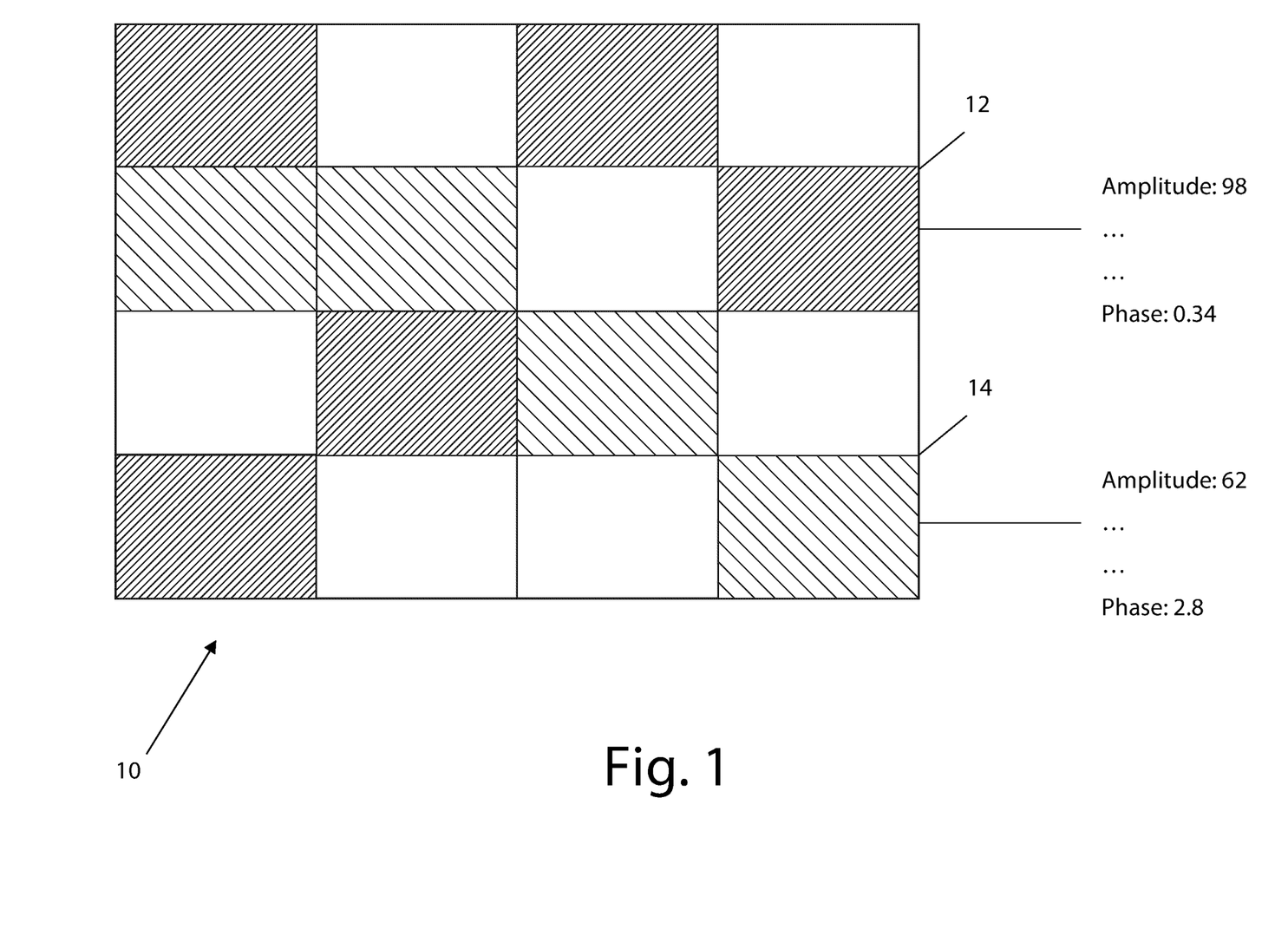
FIG. 1 depicts a simplified schematic of an example image that may be encrypted using the method of the claimed invention.
Figure 3A:
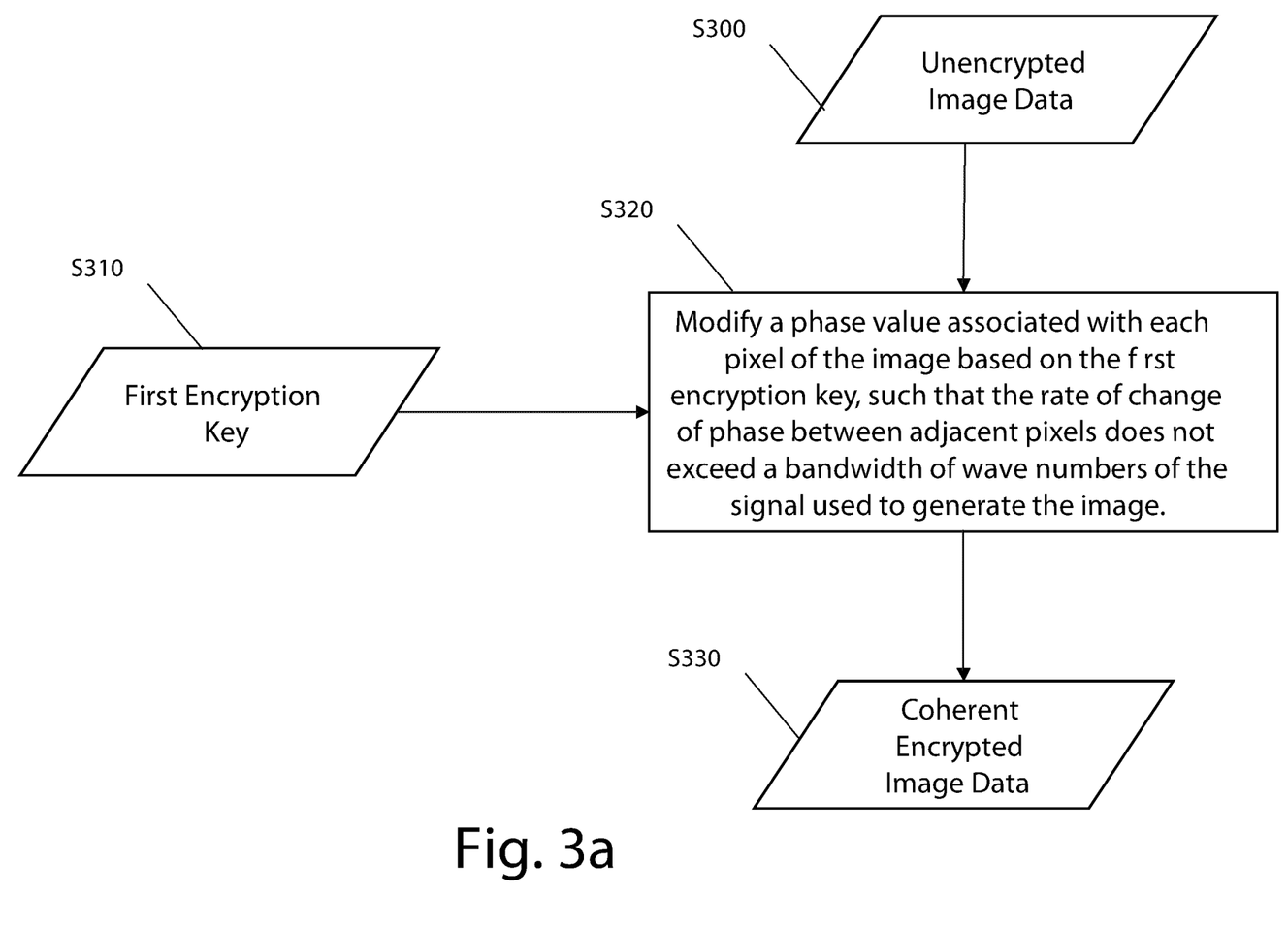
FIG. 3a depicts the steps of the method of the claimed invention.

FIG. 1 depicts a simplified schematic of an example image 10 that may be encrypted using the method of the claimed invention. The image 10 includes a plurality of pixels with data associated with each pixel of the image. Image 10 has been generated by detecting an imaging signal that has interacted with an imaging target. This could be based on a wide variety of imaging techniques including both reflection-based techniques, i.e. imaging techniques where the imaging signal is reflected from the imaging target, and transmission-based techniques, i.e. imaging techniques where the imaging signal propagates through the imaging target to the detector. A particular example of interest discussed below in relation to FIG. 3 is SAR imaging by a satellite in orbit around the Earth—an example of a radar-signal reflection-based imaging technique.

An imaging detector captures the imaging signal and its associated image data in the form of image 10 segmented into a plurality of pixels. Each pixel has one or more data values associated with it that capture the information contained within the imaging signal. For example, a first pixel 12 has a first associated phase value and a second associated amplitude value amongst other values. Similarly, a second pixel 14 has a second associated phase value and a second associated amplitude amongst other values.

The first and second associated amplitude values may be indicative of an amplitude of the generating signal as received at the first and second pixels 12, 14 respectively. The first and second associated amplitude values may be recorded as brightness values of the first and second pixels 12, 14 respectively. Alternatively, the first and second associated amplitude values may be recorded in another format, such as RGB values, CMYK values or similar. Additionally or alternatively, brightness values, RGB values and/or CMYK values or similar may be recorded as data associated with each of the pixels 12, 14 in addition to the associated amplitude values.

Associated amplitude values may be used in imaging analysis to infer various properties of the imaging target. For example, in reflection-based imaging techniques, associated amplitude values may be indicative of a reflectivity of the imaging target—e.g. a relatively higher associated amplitude value may indicate a higher reflectivity than a relatively lower associated amplitude value. This may be used, for example, in qualitative analysis to determine the type of material which constitutes the imaging target. For example, a high reflectivity may be indicative that the imaging target is formed from a reflective material such as metal. In contrast, a low reflectivity may be indicative of a non-reflective material such as wood, concrete, foliage, or similar. It is noted that for a given material, the reflectivity may be a function of the imaging signal's wavelength such that a material may have high reflectivity at certain wavelengths, and a lower reflectivity at other wavelengths.

Meanwhile, in transmission-based imaging techniques, associated amplitude values may be indicative of an attenuation coefficient of the imaging target—e.g. a relatively higher associated amplitude value may indicate a lower attenuation coefficient than a relatively lower associated amplitude value. This may be used, for example, in qualitative analysis to determine the type of material from which the imaging target is formed. For example, a low attenuation coefficient may be indicative that the imaging target is formed from an optically transparent material such as glass, a transparent liquid such as water, oil or similar, or a transparent gas such as air, carbon dioxide, methane or another greenhouse gas, oxygen, a noble gas or similar, or any other optically transparent material. In contrast, a low reflectivity may be indicative of an optically dense (or opaque) material such as lead, aluminium, or any other optically dense material. It is noted that for a given material, the attenuation coefficient may be a function of the imaging signal's wavelength such that a material may have a low attenuation coefficient at certain (typically shorter) wavelengths, and a high attenuation coefficient at other (typically longer) wavelengths. A typical example of this is greenhouse gases, or indeed many gases, which are optically transparent to visible, UV and X-ray light, but can be optically dense to long-wavelength infrared due to the high absorption coefficients in the infrared section of the electromagnetic spectrum.

The first and second associated phase values may be indicative of a relative phase of the generating signal as received at the first and second pixels 12, 14 respectively. The associated phase values may have values in the range from 0 to $2\pi$, from 0 to 360, from $-\pi$ to $\pi$, from $-180$ to 180, or any other suitable range. Additionally, data values indicative of an 'unwrapped' phase may be associated with each pixel of the image 10. In other words, while phase information is typically encoded in a cyclical fashion (in recognition that phase is a cyclically repeating property), the phase information may be unwrapped to remove the cyclical repetition and instead provide information more directly indicative of optical path length between the imaging target and the detector.

The data associated with each pixel 12, 14 of image 10 may, in some examples, be encoded with a complex number $z=x+iy$. In this way, the amplitude and phase values of each pixel 12, 14 of image 10 may be encoded within the single complex number, z. For example, the amplitude value may be determined by determining the magnitude of complex number z. In other words, the amplitude value may be determined as $|z|=(x^2+y^2)^{1/2}$. Further, for example, the phase value may be determined by determining the argument of complex number z. In other words, the phase value may be determined as $\arg(z)=\tan^{-1}(y/x)$.

Associated phase value information may be used in imaging analysis to infer various properties of the imaging target. By way of example, the skilled person will be aware that, in some instances of an image generated by reflection of a signal from a target, the phase information is indicative of total signal path length, e.g. the phase information may be unwrapped by the data user to determine the distance between the signal source and/or receiver and the surface from which the signal reflects. In most practical settings, the phase information is used to determine the distance of one reflective surface relative to another. For example, in the case of an overhead image, the phase difference between different pixels may be indicative of the relative heights of the reflecting surfaces captured in each pixel. In other examples, the skilled person will be aware that, in some instances of an image generated by transmission of a signal through a target, the phase information is indicative of the density of the target due to variations in density causing a variation in refractive index of the target and consequently altering the effective optical path, or signal path, distance.

In other words, in reflection-based imaging techniques, associated phase values may be indicative of a distance between the imaging target and the detector—e.g. in the context of overhead imaging, the associated phase values may be indicative of the relative height of the imaging target or of components of the imaging target. This may be used to determine a distance and/or height profile of the imaging target.

Meanwhile, in transmission-based imaging techniques, associated phase values may be indicative of a density profile of the imaging target. For example, density variations in the imaging target will cause variations in the effective optical path length through the imaging target for the imaging signal. In particular, a higher density target will increase the effective optical path length. This may be used to determine a density profile of the imaging target.

In some embodiments, the or each image is generated by synthetic aperture radar (SAR) imaging.

While the method of the claimed invention is applicable to a broad range of images, the method finds particularly beneficial application in the context of SAR imaging. As discussed above, the claimed invention allows a data user to implement single image coherence techniques such as autofocussing procedures, multi-look processing, and/or other frequency domain-based techniques. Meanwhile, the same data user is prevented from implementing multi-image coherence techniques such as CCD, DEM or InSAR.

In some embodiments, the or each image is a satellite-generated image.

Data security for satellite-generated images is of particular importance because of the wide range of data that an overhead satellite can collect. It may be necessary to encrypt data to protect an individual's privacy from a satellite taking images of their land—e.g., inter-image coherent image techniques may be able to determine if land is occupied by determining if a person has walked across the land or not, or by demonstrating the presence of a person based on coherence image techniques. In other applications, a government-owned data may need to be encrypted for security and/or defence purposes—for example data related to military installations must be kept secure for the safety of military and other personnel. In addition, encrypting image data may be necessary to prevent customers or clients of the data owner from accessing information that they have not been given permission for (for example, they may not have purchased or licensed the rights for said information).

Figure 2:
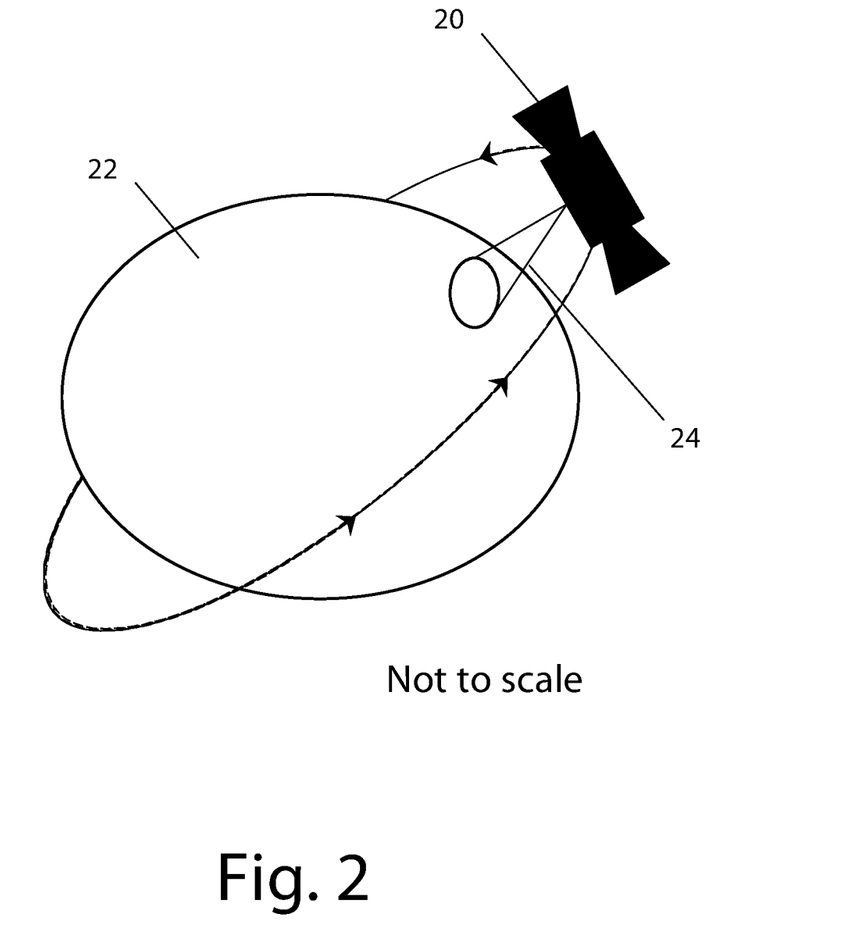
FIG. 2 depicts a schematic of a satellite in orbit around the Earth collecting SAR image data.

FIG. 2 depicts a schematic of a satellite 20 in orbit around the Earth 22 collecting SAR image data. Satellite 20 is in a repeating orbit around the Earth 22, for example a one-day repeating orbit. In order to collect SAR image data, the satellite 20 reflects a radar signal 24 off the surface of one or more imaging targets on the surface of the Earth 22. As the satellite 20 repeats its orbit, the satellite will regularly revisit the same position relative to the Earth 22. Each time the satellite 20 images the same imaging target with its radar signal from the same position relative to the Earth, the satellite captures another SAR image of the same imaging target. Each of these SAR images will be coherent with one another, meaning that a person or entity in possession of the set of coherent images will be able to implement multi-image coherent imaging techniques such as CCD, DEM, or InSAR.

In such examples, the wavelength of the imaging signal may be one appropriate for radar imaging. For example, the wavelength of the imaging signal 24 may be 0.5 centimetres or more, 1 centimetre or more, 3 centimetres or more, 5 centimetres or more, or 8 centimetres or more. In other examples, the wavelength of the imaging signal may be between 0.5 centimetres and 10 centimetres. In one particular embodiment, the wavelength of imaging signal 24 is approximately 3 centimetres.

Further, the imaging signal may have an inherent bandwidth common to that found in radar imaging signals. For example, the inherent bandwidth may be 0.5 kilohertz or more, 1 kilohertz or more, 5 kilohertz or more, or 10 kilohertz or more. In one particular embodiment, the inherent bandwidth of imaging signal 24 is approximately 4 kilohertz.

Further still, the imaging signal may acquire additional bandwidth as a result of the Doppler effect arising from the movement of satellite 20 relative to the Earth 22. This so-called Doppler bandwidth may be 1 megahertz or more, 10 megahertz or more, 100 megahertz or more, 500 megahertz or more, 1000 megahertz or more, or 5000 megahertz or more. In one particular embodiment, the Doppler bandwidth of imaging signal 24, due to the orbit of satellite 20 about the Earth 22, is approximately 300 megahertz.

In some examples, the imaging target of the satellite 20 may be a geographical area on the surface of the Earth 22. The size of the area may be 10 square kilometres or more, 50 square kilometres or more, 100 square kilometres or more, 1000 square kilometres or more, 5000 square kilometres or more, or 10 000 square kilometres or more.

For example, each of the images may be of a 5 kilometre×5 kilometre area or larger, a 10 kilometre×10 kilometre area or larger, a 50 kilometre×50 kilometre area or larger, or a 100 kilometre×100 kilometre area or larger.

In such examples, a single pixel of image 10 may image an area of 0.1 square metres or larger, 0.5 square metres or larger, 1 square metre or larger, 2 square kilometres or larger, or 5 square kilometres or larger. For example, each pixel of image 10 may correspond to an area of 0.25 metres×0.25 metres or larger, an area of 0.5 metres×0.5 metres or larger, an area of 1 metre×1 metre or larger, an area of 1.5 metres×1.5 metres or larger, or an area of 2 metres×2 metres or larger. In one particular embodiment, each pixel of image 10 corresponds to an area of 1 metre×1 metre of the imaging target.

FIG. 3a depicts the steps of the present method. In step S300, the data owner is provided with unencrypted image data in the form of image 10. Image 10 is captured by an imaging signal. The imaging signal includes a range of wavenumbers (inverse of wavelength), the range defining a bandwidth of the imaging signal. The bandwidth may be determined by down-converting the frequency of the imaging signal to effectively remove a carrier frequency associated with the signal. Before down-conversion, the bandwidth of the imaging signal may span from a lower non-zero frequency/wavenumber to a higher non-zero frequency/wavenumber. The bandwidth may be defined as the difference between the higher and lower non-zero frequencies/wavenumbers. After down-conversion, the bandwidth may span from zero frequency/wavenumber to a higher down-converted non-zero frequency/wavenumber. Said higher down-converted non-zero frequency/wavenumber may be equal to the value of the bandwidth. In step S310, the data owner is provided with a first encryption key. The first encryption key may be generated by random seed generation. In step S320, a phase value associated with each pixel 12, 14 in the image 10 is modified based on the first encryption key, such that the rate of change of phase between adjacent pixels, after encryption, does not exceed the bandwidth of the imaging signal. This encryption does not prevent a data user from being able to carry out amplitude-based analysis or single-image coherent image analysis such as autofocussing procedures, multi-look processing, and other frequency domain-based techniques. It does however preclude a person not in possession of the first encryption key from implementing multi-image coherence image analysis such as CCD, DEM, or InSAR. Finally, an encrypted image is produced as the output of the encryption process in step S330.

Encrypting the phase information associated with the image data enables the owner of the data to set up different levels of security for the image data. For example, encrypting the phase information may leave other information such as amplitude information associated with the image data unaffected. This selective encryption of phase information means that a data user can be given permission to access and review only a subset of the information associated with the image data. For example, the data user may have permission to review information indicative of the spatial intensity of an imaging signal, which may be encoded by an amplitude value associated with each pixel of the image.

When modifying the associated phase values of each pixel 12, 14 of the image 10, the rate of change of phase between adjacent pixels of the encrypted image does not exceed the bandwidth of the imaging signal. Satisfying this criterion means the sampling wavenumber range is wider than the bandwidth of the imaging signal (including the encrypted phase signal) and means that single-image coherence imaging techniques, as described above, can be implemented. In other words, by modifying the phase values of each pixel in this way, the coherence of the image itself is not destroyed. Meanwhile, the modification of phase information encrypts the image data such that phase differences between the encrypted and other (non-encrypted) images can no longer be calculated or determined in a meaningful way. In other words, while conventional methods of encrypting phase information result in a destruction of the phase information such that neither intra-image nor inter-image phase differences can be calculated or determined, the claimed invention provides a method of encryption that prevents the calculation or determination of inter-image phase differences while allowing the continued calculation or determination of intra-image phase differences. If the criterion is not adhered to then the phase information is effectively destroyed and single-image coherence imaging techniques are rendered impossible.

This further serves to facilitate an increased selective control of the level of encryption of certain images by the data owner. For example, by encrypting the image data in accordance with the methods described herein, a data user will be able to implement some analysis techniques which rely on calculating or determining intra-image phase differences. These analysis techniques may include, for example, autofocussing procedures, multi-look processing, and/or other frequency domain-based techniques. Such analysis techniques can be described more generally as single image coherence techniques. Meanwhile, the data user will be prevented from implementing multi-image coherence techniques such as CCD, DEM or InSAR which rely on the calculation or determination of inter-image phase differences.

In instances where the signal includes more than one bandwidth, for example in the case of satellite-based SAR imaging, where the imaging signal has an inherent and a Doppler bandwidth, the rate of change of phase discussed above may need to not exceed the largest of the bandwidths for the methods described herein to be operable. In some examples, the rate of change of phase discussed above may not exceed the smallest of the bandwidths associated with the signal so that information encoded in frequencies associated with the lower bandwidth may not be lost during the encryption process described herein.

In some embodiments, encrypting the image data associated with the or each image includes: selecting a portion of the or each image to be encrypted; and encrypting said portion by modifying each of the phase values respectively associated with each of the plurality of pixels within the selected portion based on the first encryption key.

In this way, the data owner is provided with a further enhanced level of selective control over the encryption of image data. For example, the data owner may choose to encrypt one or more regions of a given image and not others so as to obscure a given region (or regions) of interest. In some examples, the data owner may encrypt data associated with a central region of an image and leave one or more border regions unencrypted. In other examples, the data owner may encrypt data associated with a region of an image that images a particular subject of interest and leave the remainder of the image unencrypted.

Figure 3B:
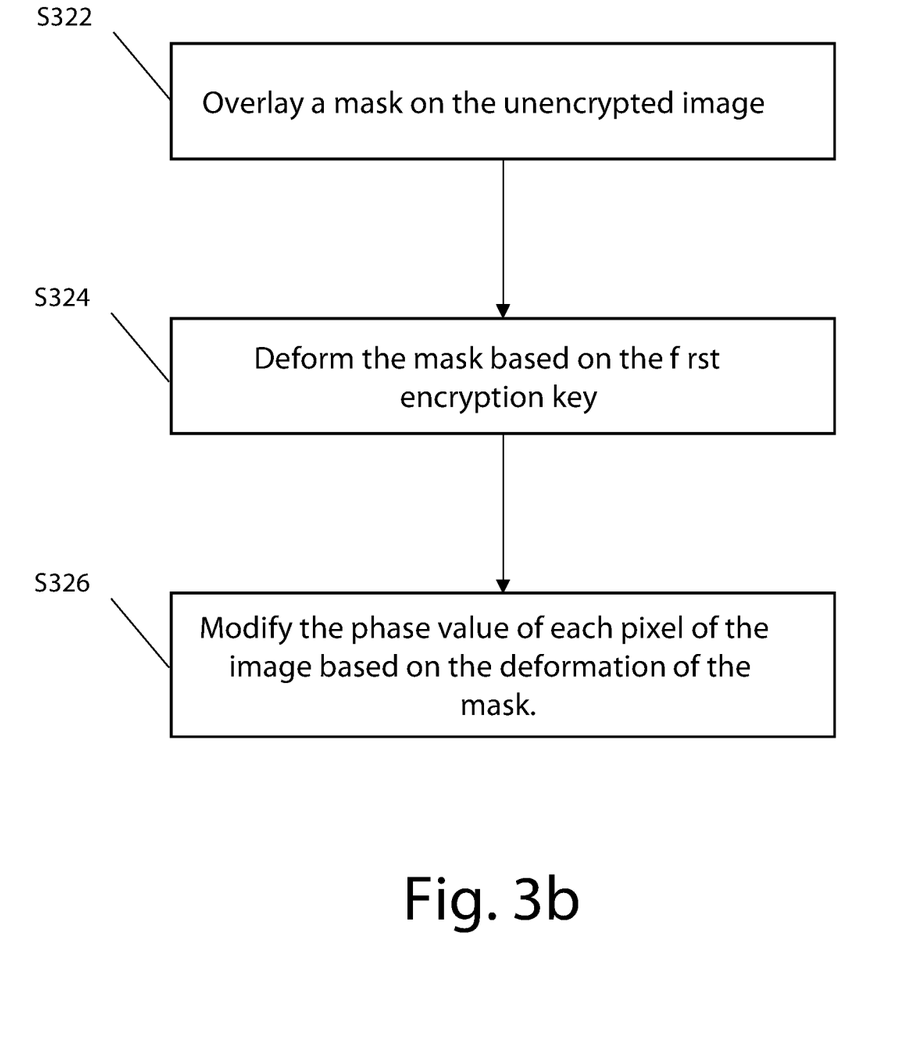
FIG. 3b depicts a method of modifying the phase values of each pixel in an image by deforming a mask, in accordance with some embodiments of the present invention.

FIG. 3b depicts a method of modifying the phase values of each pixel in an image by deforming a mask 40 (discussed below in reference to FIG. 4a-c), in accordance with some embodiments of the present invention. The steps depicted in FIG. 3b can take the place of step S320 in FIG. 3a. In step S322 of FIG. 3b, a mask 40 is overlaid on the unencrypted image 10. In step S324, the mask 40 is deformed based on the first encryption key. For example, before deformation, the mask 40 may be a flat plane overlaid on the image 10. Deforming the mask may involve adjusting the heights of certain sections of the mask relative to a plane defined by the image 10. Thus, in effect, a deformed mask 46 may be visualised as "crinkled" or "scrunched" relative to the mask 40 before it is deformed. In step S326, the phase value of each pixel of the image 10 is modified based on the deformed mask 46. In other words, the phase value of each pixel of the image 10 may be modified by assuming that the relative position of said pixel has been modified in accordance with the deformation of the mask.

In some examples, the mask, before deformation may have a phase value of zero associated with each point of the mask. Deforming the mask may involve associating a new phase value with each point of the deformed mask based on the adjusted height of said points of the mask. Modifying the phase of each pixel may then involve adding (or subtracting) the new phase value associated with a point of the deformed mask that corresponds to a respective pixel of the image 10 to (from) the phase value associated with said pixel.

In other words, in some embodiments, the method further comprises: overlaying a respective mask on the or each image to be encrypted, wherein modifying each of the phase values respectively associated with each of the plurality of pixels of the or each image to be encrypted involves: deforming the mask based on the first encryption key, and modifying each of the phase values respectively associated with each of the plurality of pixels of the or each image to be encrypted based on the deformation of the mask. In effect, the mask may be tool through which the first encryption key may be implemented to coherently encrypt the one or more images to be encrypted.

The provision of the mask, and its subsequent deformation provides a mechanism by which the phase value-modification can be gradually varied from pixel to pixel in such a way that the rate of change of phase across the image does not exceed the bandwidth of wavenumbers of the imaging signal. Modifying the phase of each pixel of the image based on the deformation of the mask provides the data owner with a means to ensure that the degree of modification does not suffer from sharp discontinuities or high rates of change as the mask can be deformed continuously to ensure compliance with the bandwidth limit on the rate of phase change across pixels.

In some embodiments, the deformed masks associated with each of the one or more images to be encrypted may have been subject to respectively different deformations.

By deforming the mask associated with each image differently, the phase information of each image is correspondingly modified differently and so any coherence between any pair of images amongst the plurality of images can be removed, thereby encrypting the information encoded in the images against inter-image coherent analysis such as CCD, DEM generation or InSAR.

In some embodiments, deforming the or each mask may be further based on a non-linear function.

In some embodiments, a respective function defining a gradient of the or each deformed mask may be discontinuous.

By non-linearly deforming the mask and/or deforming the mask such that there are discontinuities in the gradient of the mask (also known as 'low-derivative discontinuities'), the variation of phase between adjacent pixels (after the phase of each pixel has been modified based on the deformation of the mask) can be made significantly less predictable and therefore the encryption is made more secure.

Figure 4A:
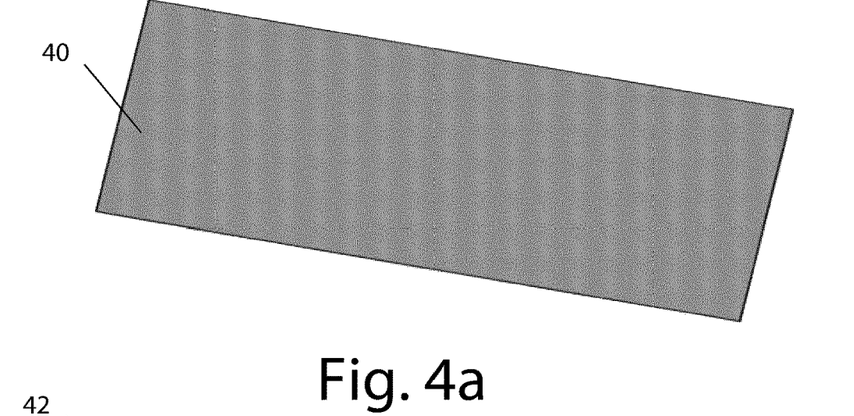
FIG. 4a depicts a mask that may be overlaid on an image to be encrypted.

FIG. 4a depicts a mask 40 that may be overlaid on the image 10 that is to be encrypted.

Figure 4B:
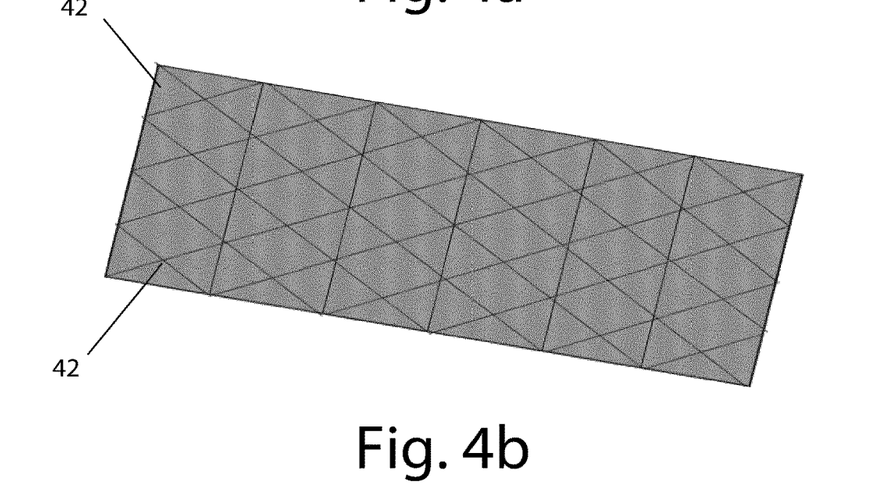
FIG. 4b depicts a mask defining a polygonal network, comprising a plurality of nodes, each node defining a vertex of the polygonal network.

FIG. 4b depicts the mask 40 including a plurality of interconnected nodes 42 defining a polygonal network 44.

Figure 4C:
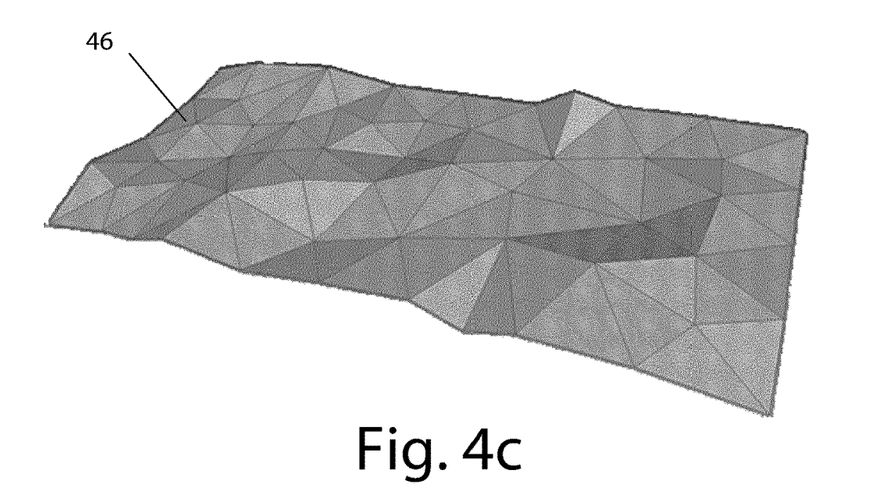
FIG. 4c depicts a mask deformed by adjusting the heights of each node of the mask relative to a plane defined by the mask before it is deformed.

FIG. 4c depicts a deformed mask 46 that has been deformed by adjusting the heights of each of the plurality of nodes 42 relative to a plane defined by the mask 40 before it is deformed.

In some embodiments, the or each respective mask comprises a plurality of nodes and deforming the mask involves adjusting the respective heights of each node relative to the respective image based on the first encryption key.

The mask may, in some examples, be deformed such that the mask is defined by a continuous gradient between nodes of the mask. This may subsequently ensure that there are no discontinuities in the rate of change of phase between pixels so that intra-image phase differences may be calculated or determined, thus facilitating single image coherence analysis techniques. Additionally, by deforming the mask based on adjusting respective heights of each node relative to the plane defined by the mask before it is deformed, the degree of computation may be reduced as the degree of deformation of sections of the mask can be interpolated based on the adjusted node heights, as opposed to requiring an input for a new adjusted height of each section of the mask corresponding to a pixel of the image. Thus, deformation by adjusting the respective heights of each node relative to the plane defined by the mask before it is deformed reduces the computational cost of the deformation, thereby making the overall method more efficient.

Other ways of deforming the mask such that the rate of change of the phase information between adjacent pixels remains below the bandwidth of the image signal are also possible. For example, the mask could be a continuous deformed plane based on a mathematical function. The deformation of the mask could comprise 'dimples' or other perturbations. The perturbations could be defined by one or more curves and/or by one or more sharp edges. In fact, any sort of parametric deformation could be used as long as the phase change rate requirements are met. The parameters of the parametric surface could then be encrypted to provide security, much as the nodes of the surface described above are encrypted.

Given that the deformation of the mask is based on the first encryption key, deforming the mask based on an adjustment of the height of the nodes further allows for a simpler encryption key. In other words, the encryption key can be shortened to an appropriate, and manageable length, as opposed to requiring an unreasonably long encryption key because every pixel of the image needs to be separately encrypted based on the first encryption key. By facilitating interpolation of the mask between the adjusted nodes, the overall computational cost of the encryption is reduced.

In some embodiments, the position of each of the plurality of nodes in the respective mask is determined based on a second encryption key.

In this way, the security of the encrypted data is further enhanced. In particular, as the position of each of the plurality of nodes in the mask is determined based on the second encryption key, no two masks will be the same, provided they are encrypted with different encryption keys. This means that not only is the phase information of the original image data held secret by virtue of encryption, but further an "eavesdropper" or other person or entity who attempts to illicitly obtain the phase information data will not even be able to determine the qualitative nature of the modification to each of the phase values. In particular, without the second encryption key, a person or entity will not know what the structure of the mask is once it has been deformed, thereby preventing said person or entity from reversing the encryption.

In some embodiments, the first and second encryption keys are the same.

In this way, the computational cost and burden of encryption the image data is reduced because only one encryption key need be stored and used as a basis for mask deformation.

In some embodiments, the first and second encryption keys are different.

In this way, the security of the image data is enhanced because a person or entity who attempts to illicitly obtain the phase information data will need to crack not just one, but two, independent encryption keys.

The data owner, or other person encrypting the image data, may choose whether the first and second encryption keys are to be the same or different according to need. For example, if the data owner has strict requirements in terms of processing speed or data storage, the first and second encryption keys may be the same. In other examples, if the data owner has very stringent data security requirements, the data owner may opt for the first and second encryption keys being different.

In some embodiments, each of the one or more nodes define a respective vertex of a polygonal network defined by the mask.

In some embodiments, each of the one or more nodes defines a respective centre of a polygon in a polygonal network defined by the mask.

In this way, the gradients of the deformed mask can be controlled such that when modifying the phase values based on the deformation of the mask, the rate of change of phase between adjacent pixels does not exceed the bandwidth of wavenumbers of the imaging signal. In some examples, deformation of each edge of each polygon is based on a linear interpolation between the nodes respectively defining the mutually distal endpoints of the edge. Further, the edges of each polygon can define points of discontinuity in the gradient of the deformed mask. In this way, as discussed above, the variation of phase between adjacent pixels (after the phase of each pixel has been modified based on the deformation of the mask) can be made significantly less predictable and therefore the encryption is made more secure.

In some embodiments, edges connecting vertices of the polygonal network are defined to maximise the area of each polygon of the polygonal network.

In this way, discontinuities in the phase change can be further avoided. In other words, maximising the area of each polygon of the polygonal network provides a further contribution to ensuring that the rate of change of phase between adjacent pixels does not exceed the bandwidth of wavenumbers of the imaging signal. The process of maximising the area of each polygon of the polygonal network can be achieved through an appropriate optimisation algorithm. For example, the polygonal network could be defined through Delaunay triangulation or another similar algorithm or method.

Each polygon of the polygonal network 44 may span several pixels of image 10. For example, the area of each polygon of the polygonal network 44 (for example each triangle of a network determined by Delaunay triangulation) may span an area equivalent to an area of 10 pixels×10 pixels or more, 50 pixels×50 pixels or more, 100 pixels×100 pixels or more, 150 pixels×150 pixels or more, or 200 pixels×200 pixels or more. In one particular example, polygonal network 44 is defined through Delaunay triangulation and each triangle spans an area equivalent to 100 pixels×100 pixels or more.

In some examples, each polygon of the polygonal network may be defined by an alternative method to Delaunay triangulation. For example, the polygonal network may be defined by Voronoi tessellation or another similar process wherein each polygon is defined by reference to one of the nodes of the polygonal network. In the case of Voronoi tessellation, each node defines the centre of a respective polygon of the polygonal network, wherein the respective polygon defines the locus of points for which the corresponding node is the closest node to said locus amongst the plurality nodes.

In some embodiments, each of the one or more images to be encrypted is encrypted with respectively different second encryption keys.

In this way, the data security of the encryption is enhanced because each image of the plurality of coherent images is further independently encrypted. Therefore, even if a person or entity illicitly decrypts one of the images, they will not be able to decrypt the other encrypted images, and therefore will not be able to restore their coherence.

In some embodiments, the first and/or second encryption keys are generated based on random seed generation.

In this way, the secrecy of the first and/or second encryption keys is maintained because it is impossible to reliably predict the outcome of a random seed generation process.

The mask 40 may be used to define the polygonal network 44 by adding a plurality of nodes 42 to the mask. The positions of the nodes 42 may be determined by use of a second encryption key. The second encryption key may be generated by random seed generation. In some instances, the second encryption key may be the same as the first encryption key while in other instances the first and second encryption keys may be different.

The plurality of interconnected nodes 42 are connected by a series of edges to define a polygonal network. The polygonal network 44 may comprise a repeated tessellation of similar polygons. For example, in the instance depicted in FIG. 4b, the polygonal network 44 comprises a series of triangles—in some cases equilateral triangles. The polygonal network 44 may be configured to maximise the area of each polygon of the polygonal network. In the example of FIG. 4b this is achieved by carrying out a Delaunay triangulation procedure. The skilled person will be aware that other appropriate optimisation algorithms may be suitable.

Deforming mask 40 to generate the deformed mask 6 involves adjusting the relative height of each of the plurality of nodes 42 based on the first encryption key. This results in the crinkled deformed mask 46 depicted in FIG. 4c which, when overlaid on the image 10 provides the basis for adjusting the phase values associated with each pixel 12, 14 of the image 10 to encrypt the image data.

Figure 5:
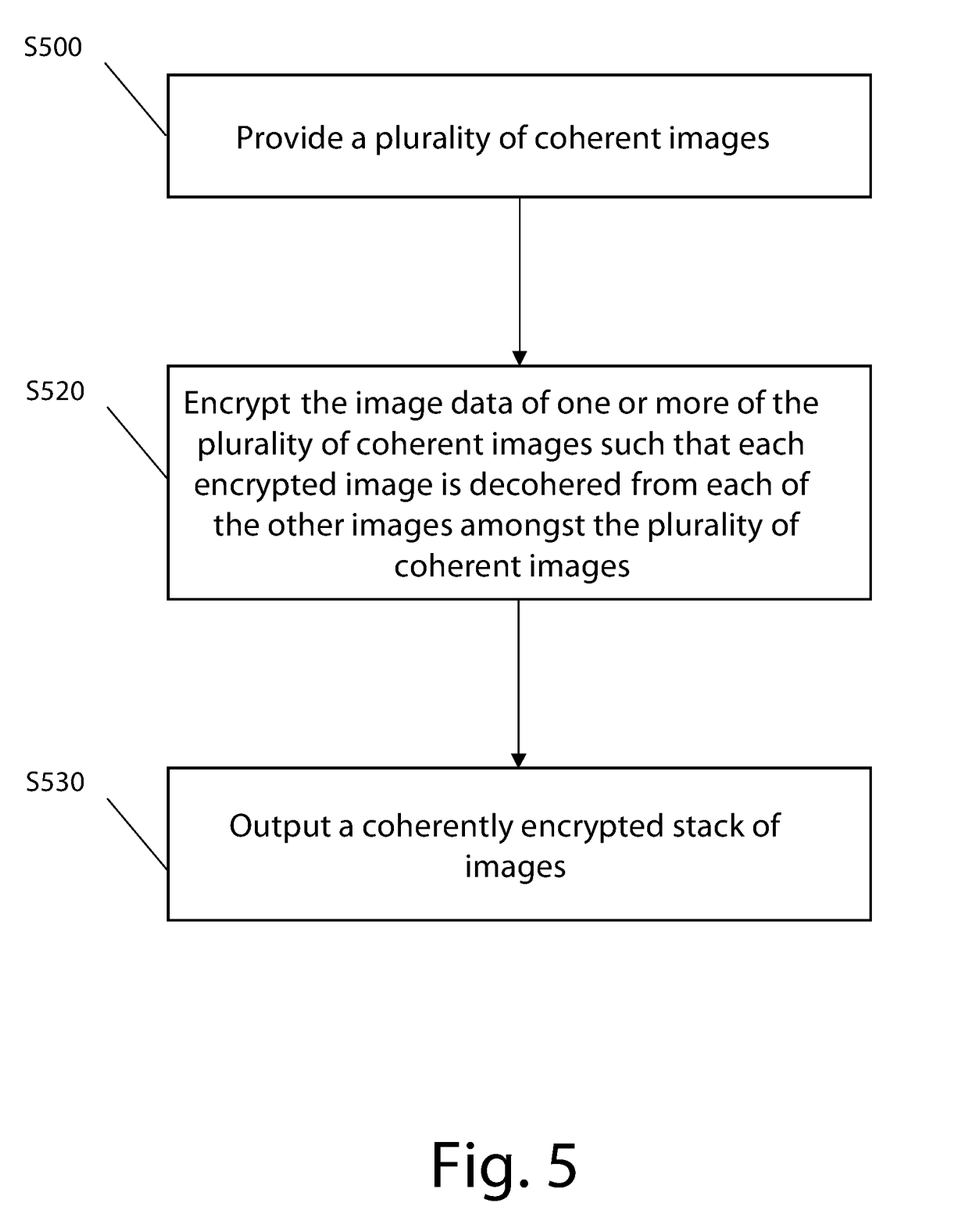
FIG. 5 depicts a method of encrypting a plurality of coherent images to remove the coherence therebetween.

FIG. 5 depicts a method of encrypting a plurality of coherent images to remove the coherence therebeteween. In step S500 a plurality of coherent images is provided to the data owner/encrypter. The plurality of coherent images could be collected via SAR imaging from a satellite 20 in a one-day repeating orbit of the Earth 22, as depicted in FIG. 2. In step S520, the image data of one or more of the plurality of coherent images is encrypted according to the method(s) depicted in FIGS. 3a-b such that the coherence between each encrypted image and each of the other images amongst the plurality of coherent images is removed. In step S530, a coherently encrypted stack of images is outputted.

In other words, in some embodiments, the method further comprises: providing a plurality of coherent images, wherein each of the plurality of coherent images is associated with respective image data, and encrypting the image data associated with one or more images of the plurality of coherent images by implementing the method of the first aspect on the image data respectively associated with each of the one or more images, wherein encrypting the one or more images removes the coherence between each of the one or more encrypted images and each of the other images of the plurality of coherent images.

The methods discussed herein may ensure that the data user will be prevented from implementing multi-image coherence techniques such as CCD, DEM or InSAR which rely on the calculation or determination of inter-image phase differences by removing the coherence between each of the encrypted images and each of the other images of the plurality of coherent images.

As discussed above, the method depicted in FIG. 5 allows a data user to implement single image coherence techniques such as autofocussing procedures, multi-look processing, and/or other frequency domain-based techniques on each image. Meanwhile, the same data user is prevented from implementing multi-image coherence techniques such as CCD, DEM or InSAR across the stack of coherently encrypted images unless they are provided with the first encryption key.

In some embodiments, the image data respectively associated with each of the one or more images is encrypted with respectively different first encryption keys.

In this way, the data security of the encryption is enhanced because each image of the plurality of coherent images is independently encrypted. Therefore, even if a person or entity illicitly decrypts one of the images, they will not be able to decrypt the other encrypted images, and therefore will not be able to restore their coherence.

Figure 6A:
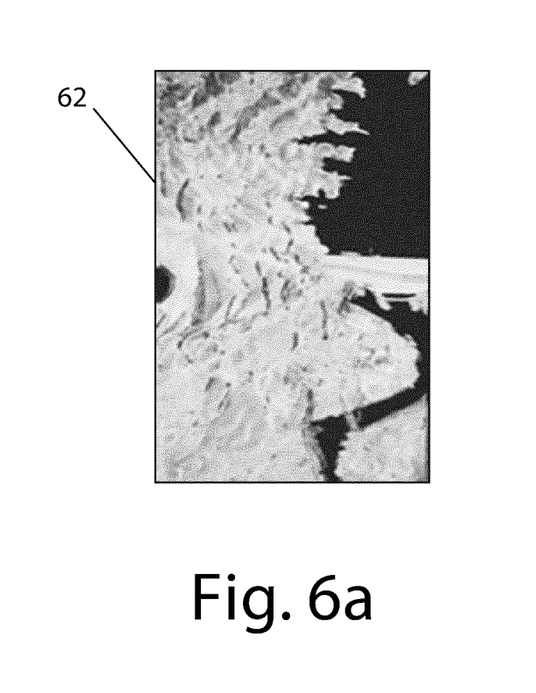
FIG. 6a depicts an example of the results of coherent change detection (CCD) between two coherent images.

FIG. 6a depicts an example of the results of CCD between two coherent images. CCD image 62 can be seen to depict the results of successful coherent change detection, including detailing of several geographical features.

Figure 6B:
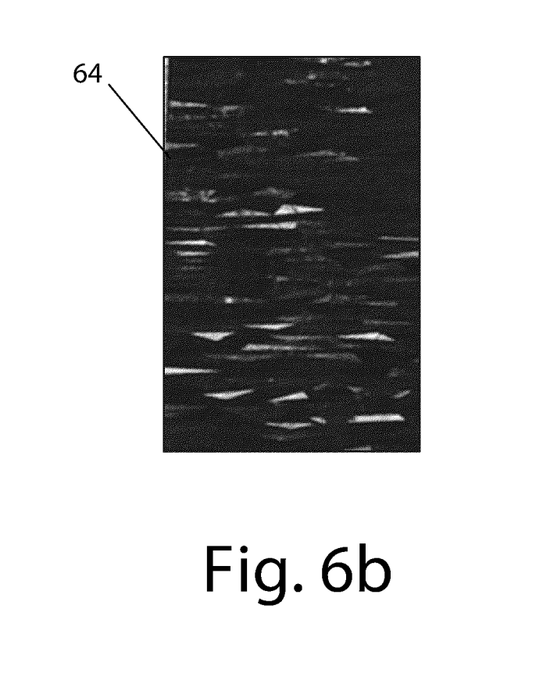
FIG. 6b depicts an example of the results of CCD between two images where the image data associated with at least one of the images has been encrypted according to the methods described herein.

FIG. 6b depicts an example of the results of CCD between two images where the image data associated with at least one of the images has been encrypted according to the methods described herein. It is easily seen that the features that are identifiable in CCD image 62 are not identifiable in 'encrypted' CCD image 64. In the example depicted in FIG. 6b, the encrypted image data has been encrypted using a mask generated through Delaunay triangulation, as described above. In the 'encrypted' CCD image 64, triangular artefacts that are the result of said Delaunay triangulation can be seen. However, it can also be seen that the triangular artefacts do not yield information regarding the underlying image data that would have been accessible had the image not been encrypted.

Figure 7:
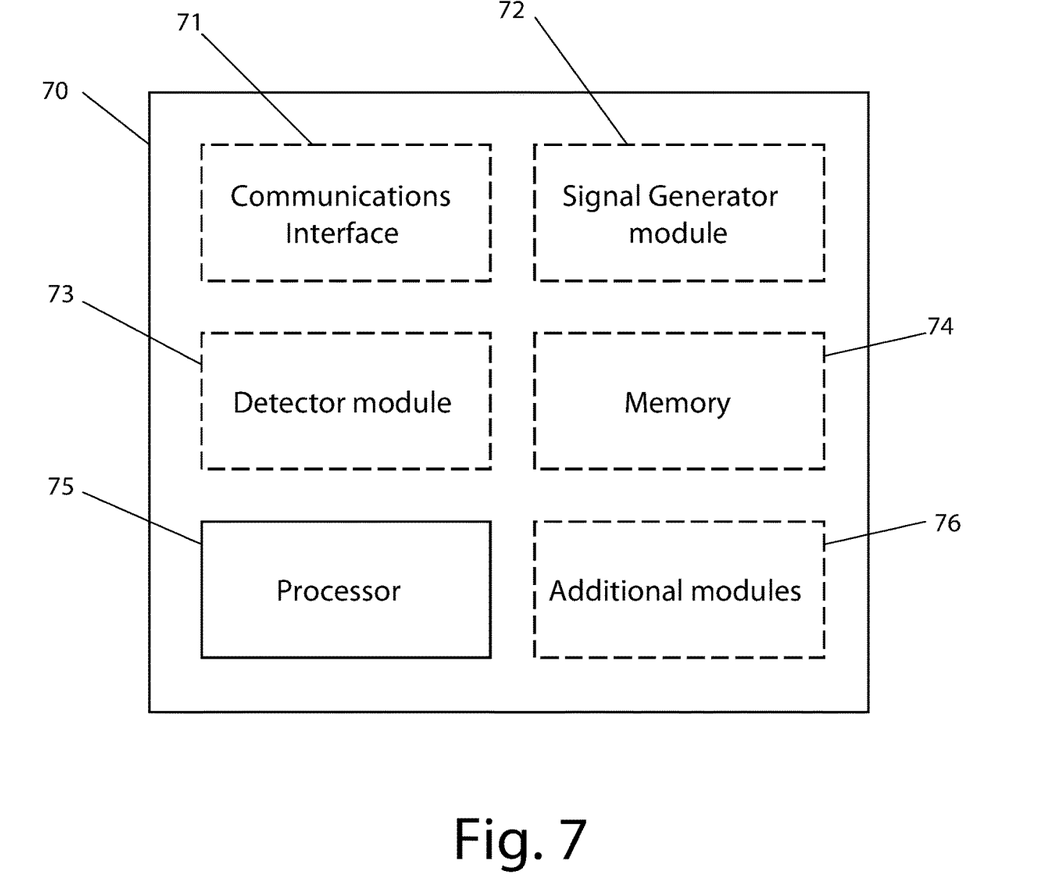
FIG. 7 depicts a computer configured to perform the method of the claimed invention.

FIG. 7 depicts an example computer 70 configured to perform the method of the claimed invention. Computer 70 comprises a communications interface 71, a signal generator module 72, a detector module 73, a memory unit 74, a processor 75, and one or more additional modules 76. Computer 70 may be an on-board computer on a satellite 20 orbiting the Earth 22 collecting SAR image data. Alternatively, computer 70 may be a ground-based computer configured to communicate with satellite 20 via the communications interface 71. The communications interface may be further configured to facilitate communication between computer 70 and a server, or between computer 70 and a user.

Signal generator module 72 may comprise instructions or logic which when executed by the computer 70, or when executed by a satellite 20 that has received said instructions or logic via the communications interface 71, cause an imaging signal 24 to be generated. The detector module 73 may comprise instructions or logic which when executed by the computer 70, or when executed by a satellite 20 that has received said instructions or logic via the communications interface 71, cause the computer 70 or satellite 20 (as the case may be) to detect/receive an imaging signal 24 comprising image data to be encrypted, and store the image data in the memory unit 74.

Processor 75 is configured to perform the method of the claimed invention. This may include processor 75 being configured to perform any of the methods depicted in FIG. 3a, 3b or 5 to encrypt the image data associated with image 10. Processor 75 may carry out the method by executing instructions or logic contained within a computer-readable medium or computer program product. The encrypted image or images may be stored in the memory 74 or communicated to a data user or data owner via the communications interface 71.

Computer 70 may comprise one or more additional modules 76. These modules may include, without limitation, one or more further processors configured to analyse image data collected by the detector module 73. The one or more additional modules 76 may further include one or more further processors configured to calibrate received/detected image data, for example by calibrating image data collected by the detector module 73 based on the angle of incidence of the imaging signal 24 or they may be configured to perform operations for image analysis, for example InSAR, CCD or DEM image analysis techniques.

In some embodiments, the methods of encrypting image data described herein are reversible.

In this way, the data owner is afforded more flexibility in determining the security levels of their data. For example, the data owner may determine that a data user who was previously not entitled to phase information relevant to inter-image coherent image techniques has become entitled. In such a situation, instead of recollecting the data to be sent to the newly authorised user, the data owner can simply provide the data user with the encryption key(s) necessary to reverse the encryption, i.e., decrypt the data.

In the embodiments described above, the method may be performed on a server. The server may comprise a single server or network of servers. In some examples, the functionality of the server may be provided by a network of servers distributed across a geographical area, such as a worldwide distributed network of servers, and a user may be connected to an appropriate one of the network servers based upon, for example, a user location.

The above description discusses embodiments of the invention with reference to a single data user or data owner for clarity. It will be understood that in practice the system may be shared by a plurality of users and/or owners, and possibly by a very large number of users and/or owners simultaneously.

The embodiments described above are fully automatic. In some examples a user or operator of the system may manually instruct some steps of the method to be carried out.

In the described embodiments of the invention the method may be performed by a system. The system may be implemented as any form of a computing and/or electronic device. Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

Various functions described herein can be implemented in hardware, software, or any combination thereof. If implemented in software, the functions can be stored on or transmitted over as one or more instructions or code on a computer-readable medium. Computer-readable media may include, for example, computer-readable storage media. Computer-readable storage media may include volatile or non-volatile, removable or non-removable media implemented in any method or technology for storage of information such as computer readable instructions, data structures, program modules or other data. A computer-readable storage media can be any available storage media that may be accessed by a computer. By way of example, and not limitation, such computer-readable storage media may comprise RAM, ROM, EEPROM, flash memory or other memory devices, CD-ROM or other optical disc storage, magnetic disc storage or other magnetic storage devices, or any other medium that can be used to carry or store desired program code in the form of instructions or data structures and that can be accessed by a computer. Disc and disk, as used herein, include compact disc (CD), laser disc, optical disc, digital versatile disc (DVD), floppy disk, and Blu-Ray® disc (BD). Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionality described herein can be performed, at least in part, by one or more hardware logic components. For example, and without limitation, hardware logic components that can be used may include Field-programmable Gate Arrays (FPGAs), Program-specific Integrated Circuits (ASICs), Program-specific Standard Products (ASSPs), System-on-a-chip systems (SOCs). Complex Programmable Logic Devices (CPLDs), etc.

It is to be understood that the computing device used to implement the method of the claimed invention may be a distributed system. Thus, for instance, several devices may be in communication by way of a network connection and may collectively perform tasks described as being performed by the computing device.

It will be appreciated that the computing device that carries out the method of the claimed invention may be located remotely and accessed via a network or other communication link (for example using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages. Variants should be considered to be included into the scope of the invention.

Any reference to 'an' item refers to one or more of those items. The term 'comprising' is used herein to mean including the method steps or elements identified, but that such steps or elements do not comprise an exclusive list and a method or apparatus may contain additional steps or elements.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something".

Further, to the extent that the term "includes" is used in either the detailed description or the claims, such term is intended to be inclusive in a manner similar to the term "comprising" as "comprising" is interpreted when employed as a transitional word in a claim.

Moreover, the acts described herein may comprise computer-executable instructions that can be implemented by one or more processors and/or stored on a computer-readable medium or media. The computer-executable instructions can include routines, sub-routines, programs, threads of execution, and/or the like. Still further, results of acts of the methods can be stored in a computer-readable medium, displayed on a display device, and/or the like.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. What has been described above includes examples of one or more embodiments. It is, of course, not possible to describe every conceivable modification and alteration of the above devices or methods for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for encrypting image data, the method comprising the steps of:
    generating the image data by collection of an imaging signal, the imaging signal having a bandwidth, the image data comprising data corresponding to a plurality of pixels of one or more images, and each pixel having an associated phase value in the or each image; and,
    encrypting the image data by modifying each of the phase values respectively associated with each of the plurality of pixels within the image data based on a first encryption key, wherein a rate of change of phase between adjacent pixels, after the step of modifying each of the phase values, does not exceed the bandwidth of the imaging signal
    whereby the portion of an encrypted image corresponding to the encrypted image data cannot be used for coherent image analysis without the first encryption key.

2. The method according to claim 1, wherein:
    the generating of the image data comprises providing a plurality of coherent images, wherein each of the plurality of coherent images is associated with respective image data;
    the encrypting of the image data comprises encrypting the respective image data associated with one or more images of the plurality of coherent images, and encrypting the one or more images removes the coherence between each of the one or more encrypted images and each of the other images of the plurality of coherent images.

3. The method according to claim 2, wherein the image data respectively associated with each of the one or more images is encrypted with respectively different first encryption keys.

4. The method according to claim 1, wherein encrypting the image data associated with the or each image includes:
selecting a portion of the or each image to be encrypted; and
encrypting said portion by modifying each of the phase values respectively associated with each of the plurality of pixels within the selected portion based on the first encryption key.

5. The method according to claim 1, further comprising:
overlaying a respective mask on the or each image to be encrypted, wherein modifying each of the phase values respectively associated with each of the plurality of pixels of the or each image to be encrypted involves:
deforming the mask based on the first encryption key; and
modifying each of the phase values respectively associated with each of the plurality of pixels of the or each image to be encrypted based on the deformation of the mask.

6. The method according to claim 5, wherein the or each respective mask comprises a plurality of nodes, and deforming the mask involves adjusting the respective-height of each node relative to the respective image based on the first encryption key.

7. The method according to claim 6, wherein a position of each of the plurality of nodes in the respective mask is determined based on a second encryption key.

8. The method according to claim 7, wherein each of the one or more images is encrypted with respectively different second encryption keys.

9. The method according to claim 6, wherein each of the plurality of nodes defines either a respective vertex of a polygonal network defined by the mask or a respective center of a polygon of a polygonal network defined by the mask.

10. The method according to claim 5 wherein the deformed masks associated with each of the one or more images to be encrypted have been subject to respectively different deformations.

11. The method according to claim 1, wherein the or each image is generated by synthetic aperture radar imaging, a satellite, or both.

12. The method according to claim 1, wherein the first encryption key is, the second encryption key is, or both are generated based on random seed generation.

13. An apparatus for encrypting image data comprising:
a processor;
processor readable memory; and
processor executable instructions stored in the memory that when executed by the processor cause the apparatus to;
encrypt image data corresponding to a plurality of pixels of an image, each pixel having an associated phase value, by modifying each of the phase values respectively associated with each of the pixels within the image data based on a first encryption key, wherein a rate of change of phase between adjacent pixels, after the modification of each of the phase values, does not exceed a bandwidth of the imaging signal from which the image data is collected,
whereby the portion of an encrypted image corresponding to the encrypted image data cannot be used for coherent image analysis without the first encryption key.

14. A non-transitory computer-readable medium comprising instructions which, when executed by a computer, cause the computer to:
encrypt image data corresponding to a plurality of pixels of an image, each pixel having an associated phase value, by modifying each of the phase values respectively associated with each of the pixels within the image data based on a first encryption key, wherein a rate of change of phase between adjacent pixels, after the modification of each of the phase values, does not exceed a bandwidth of an imaging signal from which the image data is collected
whereby the portion of an encrypted image corresponding to the encrypted image data cannot be used for coherent image analysis without the first encryption key.

15. A system for encrypting image data comprising:
a processor device; and
a stack of one or more coherent images comprising image data,
wherein:
the image data corresponds to a plurality of pixels of at least one image,
each pixel has an associated phase value,
the image data associated with at least one of the one or more coherent images is encrypted by a modification of each of the phase values respectively associated with each of the pixels within the image data based on a first encryption key, and
a rate of change of phase between adjacent pixels does not exceed a bandwidth of the imaging signal from which the image data is collected;
whereby the portion of an encrypted image corresponding to the encrypted image data cannot be used for coherent image analysis without the first encryption key.

* * * * *